United States Patent
Alcorn et al.

(10) Patent No.: US 8,037,103 B2
(45) Date of Patent: *Oct. 11, 2011

(54) ACCESSING A NON-RELATIONAL STORE WITH A CONTAINER-MANAGED PERSISTENCE BEAN VIA A WEB SERVICE FUNCTION

(75) Inventors: John William Alcorn, Heyworth, IL (US); Eric Nels Herness, Rochester, MN (US); Anh-Khoa Dinh Phan, Bloomington, MN (US)

(73) Assignee: International Business Machines Corporation, Armonk, NY (US)

( * ) Notice: Subject to any disclaimer, the term of this patent is extended or adjusted under 35 U.S.C. 154(b) by 551 days.

This patent is subject to a terminal disclaimer.

(21) Appl. No.: 12/218,921

(22) Filed: Jul. 18, 2008

(65) Prior Publication Data
US 2008/0288508 A1 Nov. 20, 2008

Related U.S. Application Data

(63) Continuation of application No. 10/739,740, filed on Dec. 18, 2003, now Pat. No. 7,457,806.

(51) Int. Cl.
*G06F 17/30* (2006.01)
*G06F 7/00* (2006.01)

(52) U.S. Cl. ........................................ 707/802; 707/803
(58) Field of Classification Search .................. 707/802, 707/803, 822, 825, 706, 711
See application file for complete search history.

(56) References Cited

U.S. PATENT DOCUMENTS
2001/0056428 A1* 12/2001 Gajda et al. .................... 707/100
2002/0091837 A1* 7/2002 Baumeister et al. ........... 709/227
* cited by examiner

*Primary Examiner* — Charles Rones
*Assistant Examiner* — Fariborz Khoshnoodi
(74) *Attorney, Agent, or Firm* — Owen J. Gamon

(57) ABSTRACT

An apparatus, system, and storage medium that in an embodiment receive a key parameter from a container-managed persistent bean, determine that the container-managed persistent bean is associated with a non-relational data store, creating a web service input message with the key parameter, and invoke a web service function with the web service input message to interface with a non-relational data store. The determination that the container-managed persistent bean is associated with a non-relational data store may be based on deployment description extension settings specified by a bean assembler. In this way, a container-managed persistent bean may be used to access a non-relational data store.

16 Claims, 11 Drawing Sheets

ACCESSING A NON-RELATIONAL STORE WITH A CONTAINER-MANAGED PERSISTENCE BEAN VIA A WEB SERVICE FUNCTION

CROSS REFERENCE TO RELATED APPLICATION

This is a continuation application of U.S. patent application Ser. No. 10/739,740, filed Dec. 18, 2003, now U.S. Pat. No. 7,457,806 to John W. Alcorn, et al., entitled "ACCESSING A NON-RELATIONAL STORE WITH A CONTAINER-MANAGED PERSISTENCE BEAN VIA A WEB SERVICE FUNCTION," which is herein incorporated by reference.

FIELD

This invention generally relates to computer systems and more specifically relates to persisting container managed persistence beans onto non-relational backend systems via the use of web services.

BACKGROUND

Software developers face the fundamental problem that writing an enterprise-wide application is difficult, and writing a distributed application is even more difficult. In addition, an enterprise seeks to build an application as fast as possible without being locked into one platform. Ideally, enterprise developers would like to be able to write the application once and run it on all of their platforms. Enterprise JavaBeans technology seeks to provide this ability.

The Enterprise JavaBeans (EJB) component architecture is designed to enable enterprises to build scalable, secure, multi-platform, business-critical applications as reusable, server-side components. Its purpose is to solve the enterprise problems by allowing the enterprise developer to focus only on writing business logic. The EJB specification creates an infrastructure that takes care of the system-level programming, such as transactions, security, threading, naming, object-life cycle, resource pooling, remote access, and persistence. EJB also simplifies access to existing applications, and provides a uniform application development model for tool creation use using object-oriented programming techniques.

Object-oriented programming techniques involve the definition, creation, use, and instruction of "objects". These objects are software entities comprising data elements or attributes and methods, which manipulate data elements. Objects also may include data related to events outside of the object to trigger or control methods within the object.

Java is an object-oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides in memory. In some cases, the JVM may be implemented in a processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. These bytecodes are executed by a Java interpreter. A Java interpreter is a module in the JVM that alternately decodes and executes a bytecode or bytecodes.

A Java bean is a reusable component. Various programs in Java may be created by aggregating different Java beans. An entity bean represents a business object in a persistent storage mechanism. Some examples of business objects are customers, orders, and products. In the J2EE (Java 2 Platform Enterprise Edition) SDK (Software Development Kit), the persistent storage mechanism is a relational database. Typically, each entity bean has an underlying table in a relational database, and each instance of the bean corresponds to a row in that table.

Entity beans differ from session beans in several ways. Entity beans are persistent, allow shared access, have primary keys, and may participate in relationships with other entity beans. Because the state of an entity bean is saved in a storage mechanism, it is persistent. Persistence means that the entity bean's state exists beyond the lifetime of the application or the J2EE server process. The data in a database is persistent because it still exists even if the database server or the applications it services are powered off.

There are two types of persistence for entity beans: bean-managed and container-managed. With bean-managed persistence, the entity bean code contains the calls that access the database. If a bean has container-managed persistence, the EJB container automatically generates the necessary database access calls. The code for the entity bean does not include these calls.

Entity beans may be shared by multiple clients. Because the clients might want to change the same data, it's important that entity beans work within transactions. Typically, the EJB container provides transaction management. In this case, the bean's deployment descriptor specifies the transaction attributes. Transaction boundaries are not coded in the bean because the container marks the boundaries.

Like a table in a relational database, an entity bean may be related to other entity beans. For example, in a college enrollment application, StudentEJB and CourseEJB would be related because students enroll in classes.

Developers implement relationships differently for entity beans with bean-managed persistence and those with container-managed persistence. With bean-managed persistence, the code implements the relationships. But, with container-managed persistence, the EJB container takes care of the relationships for the developer. For this reason, relationships in entity beans with container-managed persistence are often referred to as container-managed relationships.

The term container-managed persistence means that the EJB container handles all database access required by the entity bean. The bean's code contains no database access calls. As a result, the bean's code is not tied to a specific persistent storage mechanism (database). Because of this flexibility, even if the developer redeploys the same entity bean on different J2EE servers that use different databases, modifying or recompiling the bean's code is not necessary. In short, container-managed persistent entity beans are more portable.

Besides being much easier to develop and offering greater portability, container-managed persistent beans have additional benefits over bean-managed persistent beans, such as query, caching, and connection pooling. Also, container-managed persistent beans enable greater configuration and administration options, allowing dynamic control over access intent and connectivity parameters.

The EJB specification defines the concept of a deployment descriptor, which is stored in XML (Extensible Markup Language), which essentially contains information used during deployment of the bean to an application server. It also defines multiple roles involved in the process of creating and deploying an EJB-based application, including the bean developer, the application assembler, and the deployer. The bean developer is the one who actually writes the Java code for the EJB. The application assembler is the one who fills out the deployment descriptor, helping map the general purpose bean to a specific use, such as the specifics for the persistence of the bean, such as describing the mapping of a CMP (container managed persistence) bean to a table in a particular database vendor's database. The deployer is the one who uses the information from the deployment descriptor to generate the necessary artifacts to run the bean on a specific application server.

There are two types of deployment descriptors: generic and vendor-specific extensions. The generic one (named ejb-jar.xml), whose schema is defined by the EJB specification, and which all application server vendors must support, contains basic structural information about the bean, such as a list of the CMP fields and the key class for a given CMP bean. The deployment descriptor extensions, which are specific to a given application server vendor, contain specialized deployment information not formalized or required by the EJB specification, such as settings used by a value-added proprietary service implemented by a specific vendor. As the EJB specification evolves from version to version, the contents of the generic EJB deployment descriptor continue to expand, as vendors bring forward some of their extensions for standardization as part of upcoming versions of the EJB specification, via the Java Specification Request (JSR) process.

Unfortunately, container-managed persistent beans are only able to access relational databases. But, many users want the convenience of using container-managed persistent beans, but their data is stored in a non-relational format. Without a way for beans to access non-relational data, many users will be unable to take advantage of the convenience of the container-managed persistence.

SUMMARY

An apparatus, system, and storage medium are provided that in an embodiment receive a key parameter from a container-managed persistent bean, determine that the container-managed persistent bean is associated with a non-relational data store, creating a web service input message with the key parameter, and invoke a web service function with the web service input message to interface with a non-relational data store. The determination that the container-managed persistent bean is associated with a non-relational data store may be based on deployment description extension settings specified by a bean assembler. In this way, a container-managed persistent bean may be used to indirectly access a non-relational data store with the deployer needing to know how to interact with the web service function, but not needing to know the details of how to directly interact with the non-relational data store.

DETAILED DESCRIPTION

A method, apparatus, system, and signal-bearing medium are provided that in an embodiment receive a key parameter from a container-managed persistent bean, determine that the container-managed persistent bean is associated with a non-relational data store, creating a web service input message with the key parameter, and invoke a web service function with the web service input message to interface with a non-relational data store. In this way, a container-managed persistent bean may be used to indirectly access a non-relational data store with the deployer needing to know how to interact with the web service function, but not needing to know the details of how to directly interact with the non-relational data store.

It is important to note that the person in the role of the bean developer does not need to know or care how the CMP bean is persisted. The bean developer can define the bean's persistent fields without any knowledge of how they will actually be persisted in the real-life production environment, and can proceed to develop the business logic for the bean and perform testing on the bean using any form of persistence for the purposes of the test; for example the bean developer might use a lightweight, pure Java relational database running in the same JVM as the bean (such as IBM's Cloudscape) if desired. In an embodiment, the person in the role of the application assembler is the first one that cares about the actual persistence settings. Using a graphical assembly tool, such as IBM's Application Server ToolKit (ASTK), the assembler specifies settings, such as the name of a Web Services Definition Language (WSDL) file that describes the web service that will be used. The output of such a tool is, in an embodiment, a vendor-specific deployment descriptor extension XML file, such as ibm-ejb-jar-ext.xmi, that is stored inside the EJB jar file. The person in the role of the deployer then uses the information in this deployment descriptor extension, in conjunction with the vendor-specific deployment tools offered by the application server, to generate the necessary artifacts, such as a FunctionSet implementation class. These vendor-specific deployment artifacts contain the information (gathered from the deployment descriptor extensions) that are used at runtime to determine whether a bean is to be persisted to a relational or non-relational data store.

Figure 1:
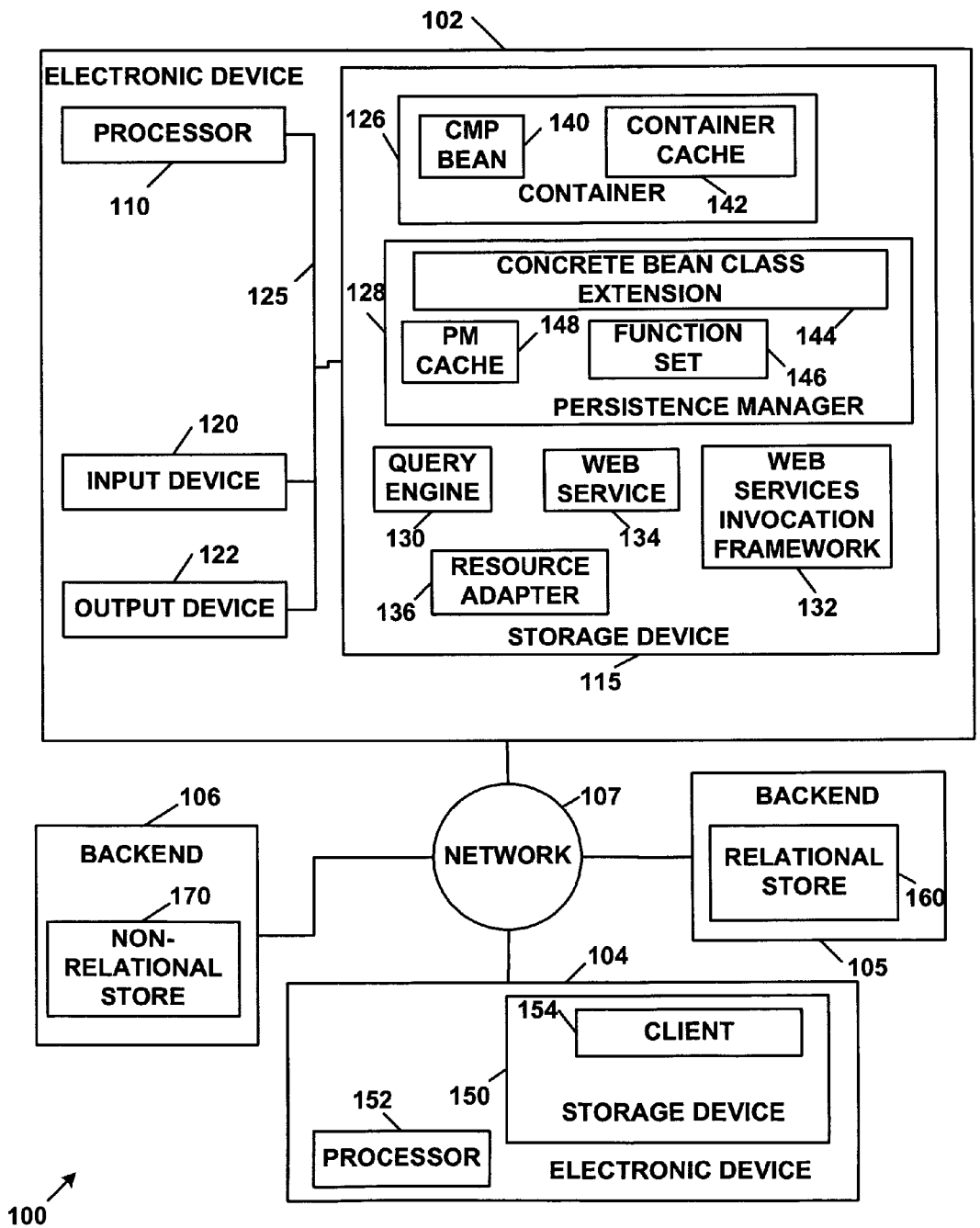
FIG. 1 depicts a block diagram of an example system for implementing an embodiment of the invention.

FIG. 1 depicts a block diagram of an example system 100 for implementing an embodiment of the invention. The system 100 includes electronic devices 102 and 104 connected to backend devices 105 and 106 via a network 107. Although only one electronic device 102, one electronic device 104, one backend 105, one backend 106, and one network 107 are shown, in other embodiments any number or combination of them may be present.

The electronic device 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although in other embodiments any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the storage device 115, the network 107, the input device 120, and/or the output device 122.

Although the electronic device 102 is shown to contain only a single processor 110 and a single bus 125, embodiments of the present invention apply equally to servers that may have multiple processors and multiple buses with some or all performing different functions in different ways. In an embodiment, the electronic device 102 may be implemented via a Websphere Application Server available from International Business Machines, Inc. But, in other embodiments any appropriate electronic device may be used.

The storage device 115 represents one or more mechanisms for storing data. For example, the storage device 115 may include read only memory (ROM), random access memory (RAM), magnetic disk storage media, optical storage media, flash memory devices, and/or other machine-readable media. In other embodiments, any appropriate type of storage device may be used. Although only one storage device 115 is shown, multiple storage devices and multiple types of storage devices may be present. Further, although the electronic device 102 is drawn to contain the storage device 115, it may be distributed across other electronic devices, such as devices connected to the network 107.

The storage device 115 includes a container 126, a persistence manager 128, a query engine 130, a web services invocation framework (WSIF) 132, a web service 134, and a resource adapter 136, all of which in various embodiments may have any number of instances. The container 126 includes a container managed persistence (CMP) bean 140, and a container cache 142. The container 126 caches the CMP bean 140 in the container cache 142. Although this embodiment refers to the use of the open-source WSIF APIs (Application Program Interface) from Apache, in order to invoke the web service, embodiments of the invention are also applicable to other APIs for invoking web serves, such as the Java API for XML Remote Procedure Calls (JAX-RPC) or other web service interaction APIs.

The persistence manager 128 includes a concrete bean class extension 144, a persistence manager cache 148, and a function set 146. The function set 146 includes instructions capable of executing on the processor 110 or statements capable of being interpreted by instructions executing on the processor 110 to carry out the functions as further described below with reference to FIGS. 2-9. The function set 146 makes requests to the web services invocation framework 132, which uses the web service 134 to send the requests to the backend 105 and/or the backend 106 on a connection managed by the resource adapter 136. The query engine 130 manages queries that the electronic device 102 sends to the backend 105 and/or the backend 106.

Although the web service 134 is illustrated as being in the same electronic device 102 as the function set 146 and the web services invocation framework 132, in another embodiment the web service 134 may be on a different electronic device from the function set 146 and/or the web services invocation framework 132, such as on another device connected to the network 107.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces, if any, of the electronic device 102. Although only one input device 120 is shown, in another embodiment any number, including zero, and type of input devices may be present.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number of output devices of different types or of the same type may be present. In another embodiment, the output device 122 is not present.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The electronic device 102 may be implemented using any suitable hardware and/or software. Examples of electronic devices are personal computers, portable computers, laptop or notebook computers, PDAs (Personal Digital Assistants), pocket computers, telephones, pagers, automobiles, teleconferencing systems, appliances, midrange computers, and mainframe computers, but in other embodiments any appropriate electronic device may be used. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The electronic device 104 may be an electronic device implemented via any suitable hardware and/or software that sends requests to and receives responses from the electronic device 102 via the network 107. The electronic device 104 may include a storage device 150 and a processor 152 analogous to those already described above with reference to the electronic device 102. The electronic device 104 may further contain other components in various embodiments, such as an unillustrated input device, a bus, or any other appropriate components. The storage device 150 includes a client 154. The client 140 performs transactions and sends associated requests to the server 102 to accomplish the transactions. The server 102 accesses data in the backend 105 and/or the backend 106 in response to the requests from the client 154.

The backend 105 includes a relational store 160. The relational store 160 may be a database or database management system that stores data in tables, i.e., rows and columns of data, and performs searches by using data in a specified column or columns of one table to find additional data in another table. The rows of a table represent records (collections of information about separate items) and the columns represent fields (particular attributes about the separate items). When performing the search, the relational database matches information from a field in one table with information in a corresponding field of another table to produce a third table that combines request data from both tables. Examples of relational databases are DB2 (Database 2), and Oracle9i, although in other embodiments any appropriate relational store may be used.

The backend 106 includes a non-relational store 170. In contrast to the relational database, in a non-relational database, only one table can be used at a time. Unlike relational databases, there is no common language or API for communicating with non-relational data stores, making interaction with them proprietary and difficult, especially for developers skilled primarily in J2EE (Java 2 Platform Enterprise Edition). Examples of non-relational stores are IMS (Information Management System), CICS (Customer Information Control System), and a flat file (a one or two-dimensional array, a list, or a file that has no hierarchical structure), but in other embodiments any appropriate non-relational store may be used.

The network 107 may be any suitable network or combination of networks and may support any appropriate protocol suitable for communication of data and/or code to/from the electronic device 102, the electronic device 104, the backend 105, and the backend 106. In various embodiments, the network 107 may represent a storage device or a combination of storage devices. In an embodiment, the network 107 may support the Infiniband architecture. In another embodiment, the network 107 may support wireless communications. In another embodiment, the network 107 may support hardwired communications, such as a telephone line or cable. In another embodiment, the network 107 may support the Ethernet IEEE (Institute of Electrical and Electronics Engineers) 802.3x specification. In another embodiment, the network 107 may be the Internet and may support IP (Internet Protocol). In another embodiment, the network 107 may be a local area network (LAN) or a wide area network (WAN). In another embodiment, the network 107 may be a hotspot service provider network. In another embodiment, the network 107 may be an intranet. In another embodiment, the network 107 may be a GPRS (General Packet Radio Service) network. In another embodiment, the network 107 may be any appropriate cellular data network or cell-based radio network technology. In another embodiment, the network 107 may be an IEEE 802.11B wireless network. In still another embodiment, the network 107 may be any suitable network or combination of networks. Although one network 107 is shown, in other embodiments any number of networks (of the same or different types) may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 102 and/or the electronic device 104, and that, when read and executed by one or more processors in the electronic device 102 and/or the electronic device 104, cause the electronic device 102 and/or the electronic device 104 to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic devices 102 and 104 via a variety of signal-bearing media, which include, but are not limited to:

(1) information permanently stored on a non-rewriteable storage medium, e.g., a read-only memory device attached to or within a server, such as a CD-ROM readable by a CD-ROM drive;

(2) alterable information stored on a rewriteable storage medium, e.g., a hard disk drive or diskette; or (3) information conveyed to a server by a communications medium, such as through a computer or a telephone network, e.g., the network 107, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
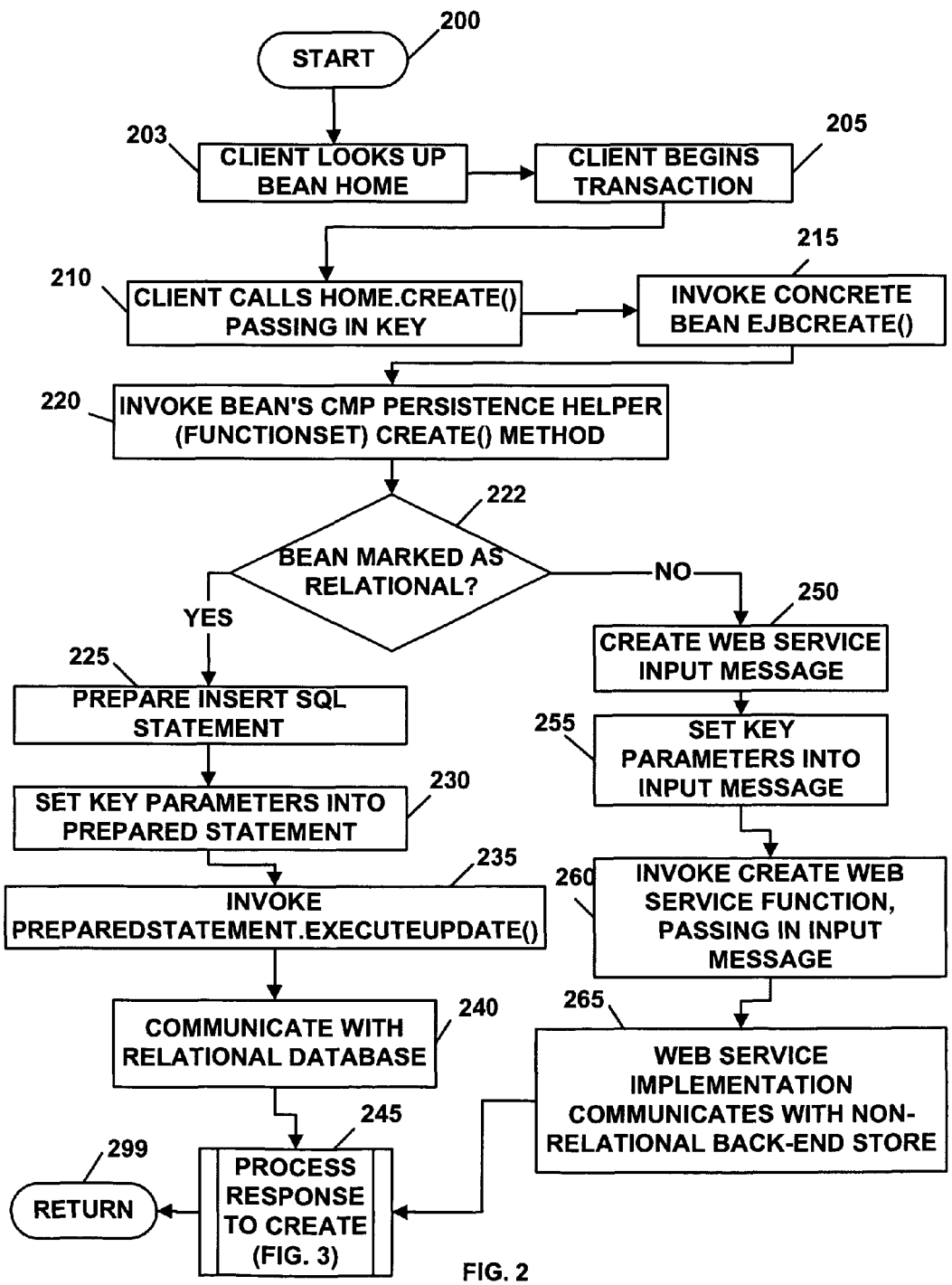
FIG. 2 depicts a flowchart of example processing for a create scenario, according to an embodiment of the invention.

FIG. 2 depicts a flowchart of example processing for a create scenario, according to an embodiment of the invention. Control begins at block 200. Control then continues to block 203 where the client 154 looks up a bean home in preparation for using the CMP bean 140. In an embodiment, the client 154 may look up a bean home using the JNDI (Java Naming and Directory Interface) name space, but in other embodiments any appropriate technique for finding the bean home may be used. Control then continues to block 205 where the client 154 begins a transaction. Examples of transactions include storing data in the non-relational store 170 in the backend 106 or the relational store 160 in the backend 105, but in other embodiments any appropriate transaction may be used.

Control then continues to block 210 where the client 154 invokes a create method in the CMP bean 140 to create an instance of the CMP bean 140. The client 154 passes a key to the create method, which specifies the instance of the primary key class that the client 154 wishes to use. A primary key is a unique identifier of an object. In an embodiment, the primary key relates directly to a primary key in a database table of the non-relational store 170 and/or the relational store 160. In another embodiment, the primary key does not relate directly (or has no relationship) to a primary key of a database table.

Control then continues to block 215 where the create method in the CMP bean 140 causes a create method in the concrete bean class extension 144 to be invoked. In an embodiment, the create method in the concrete bean class extension 144 is an ejbCreate( ) method, which is part of EJB (Enterprise Java Beans), but in another embodiment any appropriate create method may be used.

Control then continues to block 220 where the create method in the concrete bean class extension 144 causes the CMP bean's 140 persistence helper create method in the function set 146 to be invoked. Control then continues to block 222 where the create method in the function set 146 determines whether the CMP bean 140 is marked as relational. If the determination at block 222 is true, then control continues to block 225 where the create method in the function set 146 prepares an insert statement. In an embodiment, the insert statement is a JDBC (Java Database Connectivity) insert statement, but in other embodiments, the insert statement may follow any appropriate protocol.

Control then continues to block 230 where the create method in the function set 146 sets the key parameters (previously passed at block 210) into the prepared insert statement. Control then continues to block 235 where the create method in the function set 146 invokes the prepared statement. Control then continues to block 240 where the key parameters are communicated to the relational store 160 in the backend 105. Control then continues to block 245 where the response to the create method is processed, as further described below with reference to FIG. 3. Control then continues to block 299 where the logic of FIG. 2 returns.

If the determination at block 222 is false, then the CMP bean 140 is marked as non-relational, so control continues to block 250 where the create method in the function set 146 creates a web service input message. Control then continues to block 255 where the create method in the function set 146 sets key parameters (previously obtained at block 210) into the created input message. Control then continues to block 260 where the create method in the function set 146 invokes the create web service function in the web service 134 via the web services invocation framework 132 and passes the input message. Control then continues to block 265 where the web service 134 communicates the input message to the non-relational store 170 in the backend 106. Control then continues to block 245, as previously described above.

Figure 3:
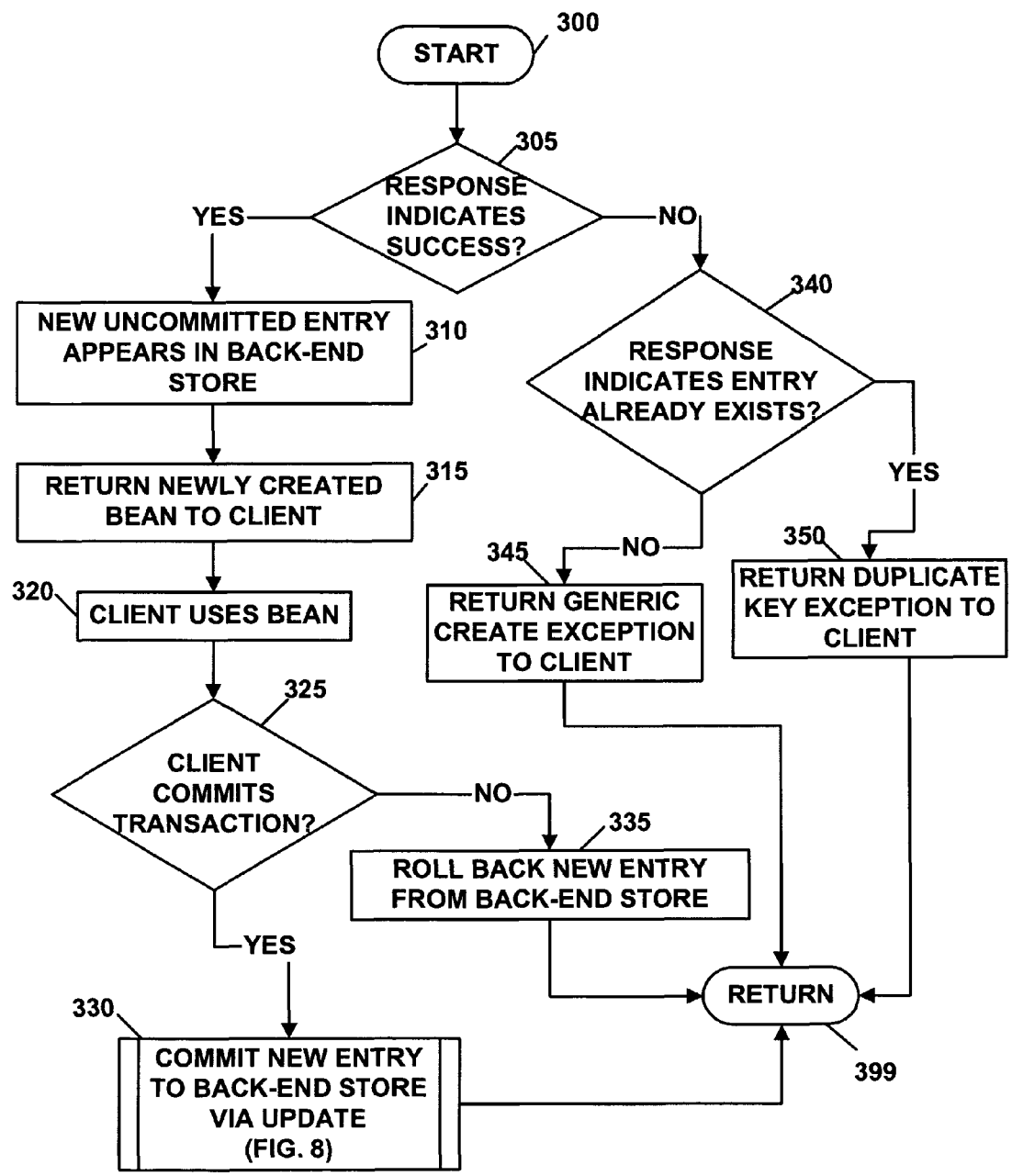
FIG. 3 depicts a flowchart of example processing for a response to a create, according to an embodiment of the invention.

FIG. 3 depicts a flowchart of example processing for a response to a create, according to an embodiment of the invention. Control begins at block 300. Control then continues to block 305 where the create method in the function set 146 determines whether the response to the input message or prepared statement indicates success.

If the determination at block 305 is true then a new uncommitted entry appears in the back-end store (either the non-relational store 170 or the relational store 160) as indicated at block 310. Control then continues to block 315 where the create method in the function set 146 returns the newly created CMP bean 140 to the client 154. Control then continues to block 320 where the client 154 uses the bean to meet the client's needs. Control then continues to block 325 where the client 154 decides whether to commit the transaction in the back-end store (either the non-relational store 170 or the relational store 160). If the determination at block 325 is true, then control continues to block 330 where the new entry is committed to the back-end store via an update, as further described below with reference to FIG. 8. Control then continues to block 399 where the logic of FIG. 3 returns.

If the determination at block 325 is false, then control continues to block 335 where the new entry in the back-end store (either the non-relational store 170 or the relational store 160) is rolled back. Control then continues to block 399 where the logic of FIG. 3 returns.

If the determination at block 305 is false, then the response indicates failure, so control continues to block 340 where the create method in the function set 146 determines whether the response indicates the key entry that was to be added by the create already exists in the backend (either in the non-relational store 170 or the relational store 160). If the determination at block 340 is true, then the entry already exists, so control continues to block 350 where the create method in the function set 146 returns a duplicate key exception to the client 154. Control then continues to block 399 where the logic of FIG. 3 returns.

If the determination at block 340 is false, then control continues to block 345 where the create method in the function set 146 returns a generic create exception to the client 154. Control then continues to block 399 where the logic of FIG. 3 returns.

Figure 4:
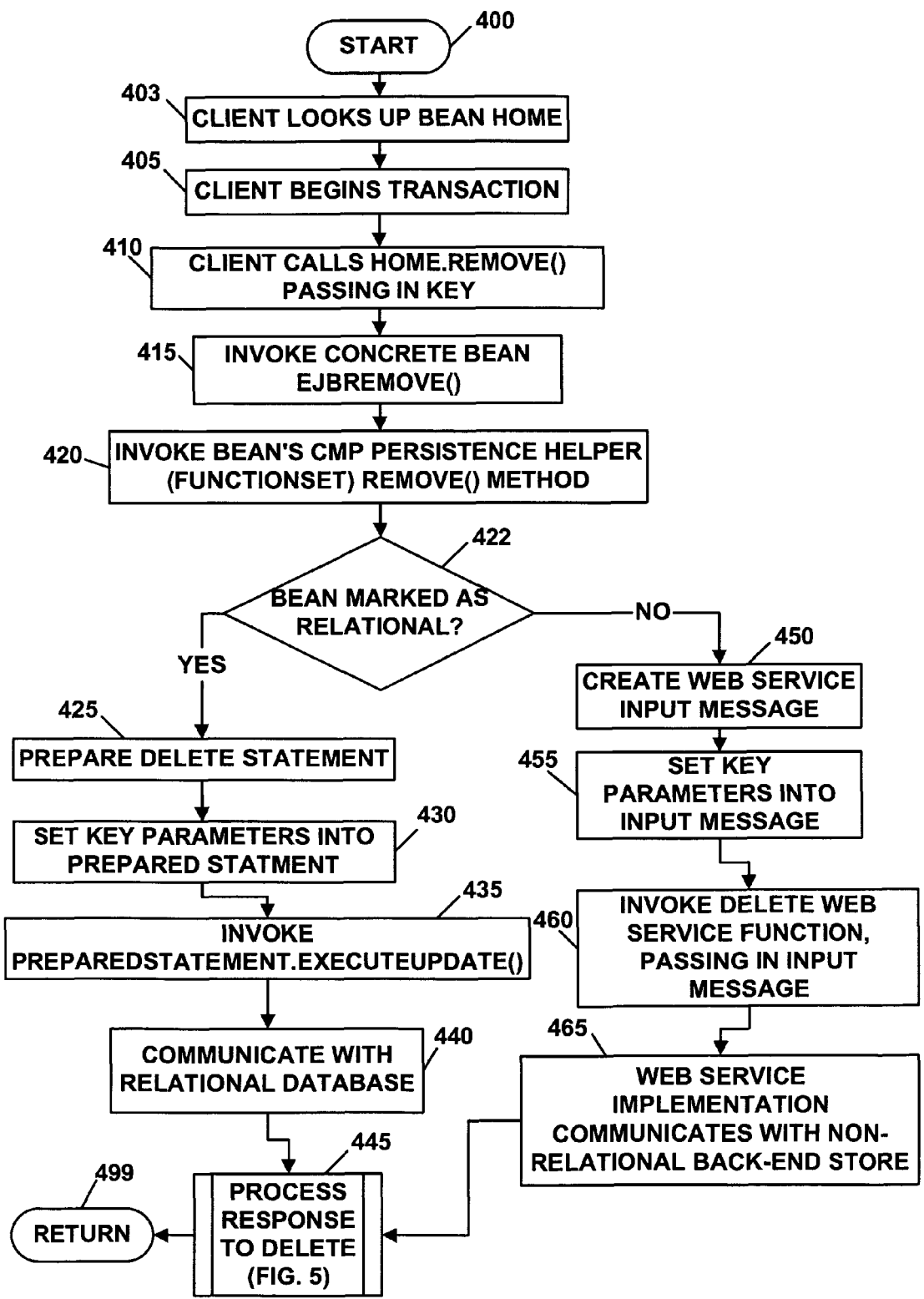
FIG. 4 depicts a flowchart of example processing for a delete scenario, according to an embodiment of the invention.

FIG. 4 depicts a flowchart of example processing for a delete scenario, according to an embodiment of the invention. Control begins at block 400. Control then continues to block 403 where the client 154 looks up a bean home in preparation for using the CMP bean 140. In an embodiment, the client 154 may look up a bean home using the JNDI (Java Naming and Directory Interface) name space, but in other embodiments any appropriate technique for finding the bean home may be used. Control then continues to block 405 where the client 154 begins a transaction. Examples of transactions include deleting data from the non-relational store 170 in the backend 106 or the relational store 160 in the backend 105, but in other embodiments any appropriate transaction may be used.

Control then continues to block 410 where the client 154 invokes a remove method in the CMP bean 140 to create an instance of the CMP bean 140. The client 154 passes a key to the remove method, which specifies the primary key class that the client 154 wishes to remove. A primary key is a unique identifier of an object. In an embodiment, the primary key relates directly to a primary key in a database table of the non-relational store 170 and/or the relational store 160. In another embodiment, the primary key does not relate directly (or has no relationship) to a primary key of a database table.

Control then continues to block 415 where the remove method in the CMP bean 140 causes a remove method in the concrete bean class extension 144 to be invoked. In an embodiment, the remove method in the concrete bean class extension 144 is an ejbRemove( ) method, which is part of EJB (Enterprise Java Beans), but in another embodiment any appropriate remove method may be used.

Control then continues to block 420 where the remove method in the concrete bean class extension 144 causes the CMP bean's 140 persistence helper remove method in the function set 146 to be invoked. Control then continues to block 422 where the remove method in the function set 146 determines whether the CMP bean 140 is marked as relational. If the determination at block 422 is true, then control continues to block 425 where the remove method in the function set 146 prepares an delete statement. In an embodiment, the delete statement is a JDBC (Java Database Connectivity) delete statement, but in other embodiments, the delete statement may follow any appropriate protocol.

Control then continues to block 430 where the remove method in the function set 146 sets the key parameters (previously passed at block 410) into the prepared delete statement. Control then continues to block 435 where the remove method in the function set 146 invokes the prepared delete statement. Control then continues to block 440 where the key parameters are communicated to the relational store 160 in the backend 105. Control then continues to block 445 where the response to the delete statement is processed, as further described below with reference to FIG. 5. Control then continues to block 499 where the logic of FIG. 4 returns.

If the determination at block 422 is false, then the CMP bean 140 is marked as non-relational, so control continues to block 450 where the remove method in the function set 146 creates a web service input message. Control then continues to block 455 where the remove method in the function set 146 sets key parameters (previously obtained at block 410) into the created input message. Control then continues to block 460 where the remove method in the function set 146 invokes the delete web service function in the web service 134 via the web services invocation framework 132 and passes the input message. Control then continues to block 465 where the web service 134 communicates the input message to the non-relational store 170 in the backend 106. Control then continues to block 445, as previously described above.

Figure 5:
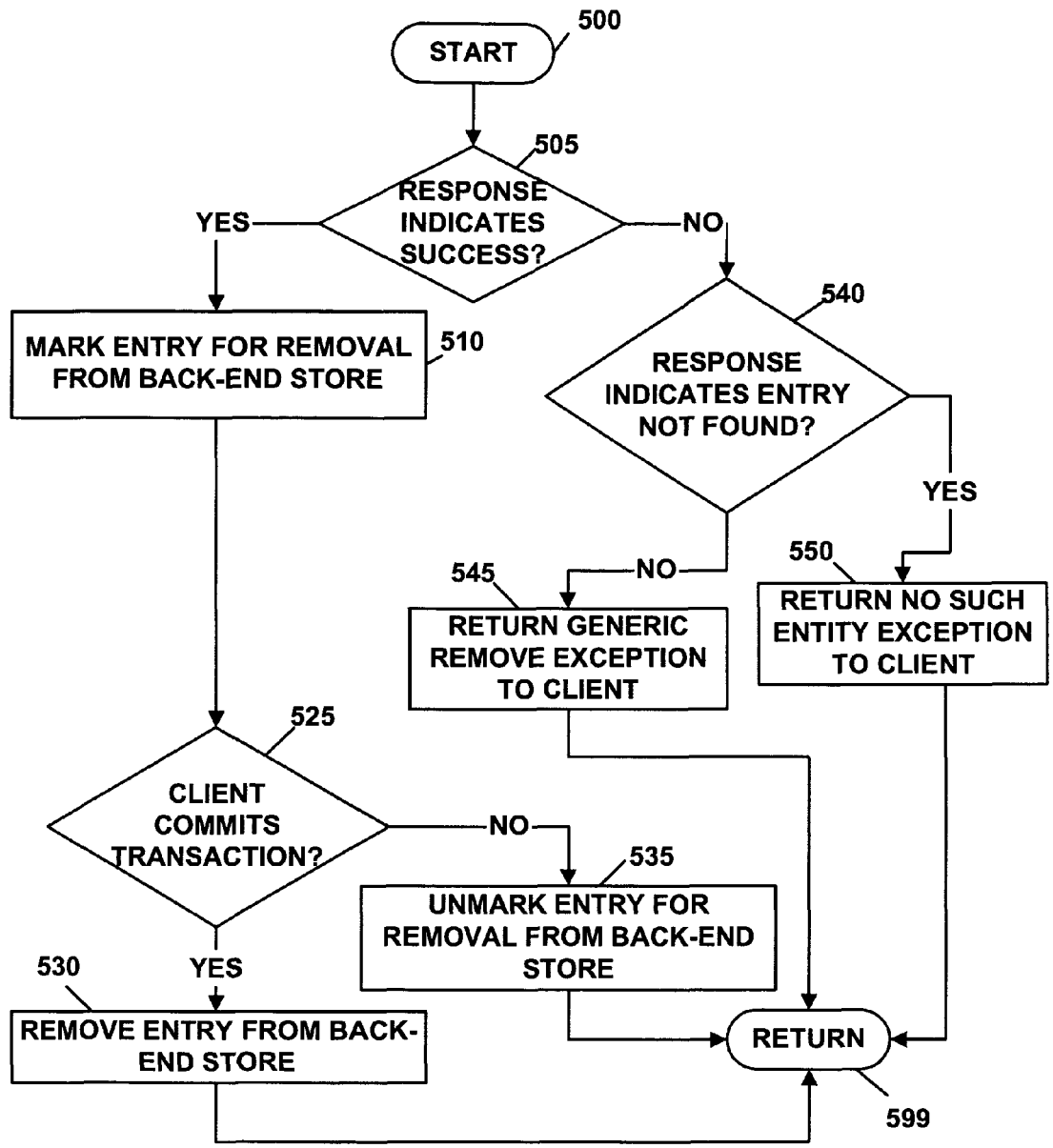
FIG. 5 depicts a flowchart of example processing for a response to a delete, according to an embodiment of the invention.

FIG. 5 depicts a flowchart of example processing for a response to a delete, according to an embodiment of the invention. Control begins at block 500. Control then continues to block 505 where the remove method in the function set 146 determines whether the response to the input message or prepared statement indicates success.

If the determination at block 505 is true then control continues to block 510 where the remove method in the function set 146 marks the entry for removal from the back-end store. Control then continues to block 525 where the remove method in the function set 146 determines whether the client 154 commits the transaction.

If the determination at block 525 is true, then control continues to block 530 where the marked entry is removed from the back-end store (either the non-relational store 170 or the relational store 160). Control then continues to block 599 where the logic of FIG. 5 returns.

If the determination at block 525 is false, then control continues to block 535 where the remove method in the function set 146 unmarks the entry for removal from the back-end store. Control then continues to block 599 where the logic of FIG. 5 returns.

If the determination at block 505 is false, then the response indicates failure, so control continues to block 540 where the remove method in the function set 146 determines whether the response indicates the key entry to be deleted from the back-end store (either the non-relational store 170 or the relational store 160) was not found. If the determination at block 540 is true, then the entry was not found, so control continues to block 550 where the remove method in the function set 146 returns a no such entity exception to the client 154. Control then continues to block 599 where the logic of FIG. 5 returns.

If the determination at block 540 is false, then control continues to block 545 where the remove method in the function set 146 returns a generic remove exception to the client 154. Control then continues to block 599 where the logic of FIG. 5 returns.

Figure 6:
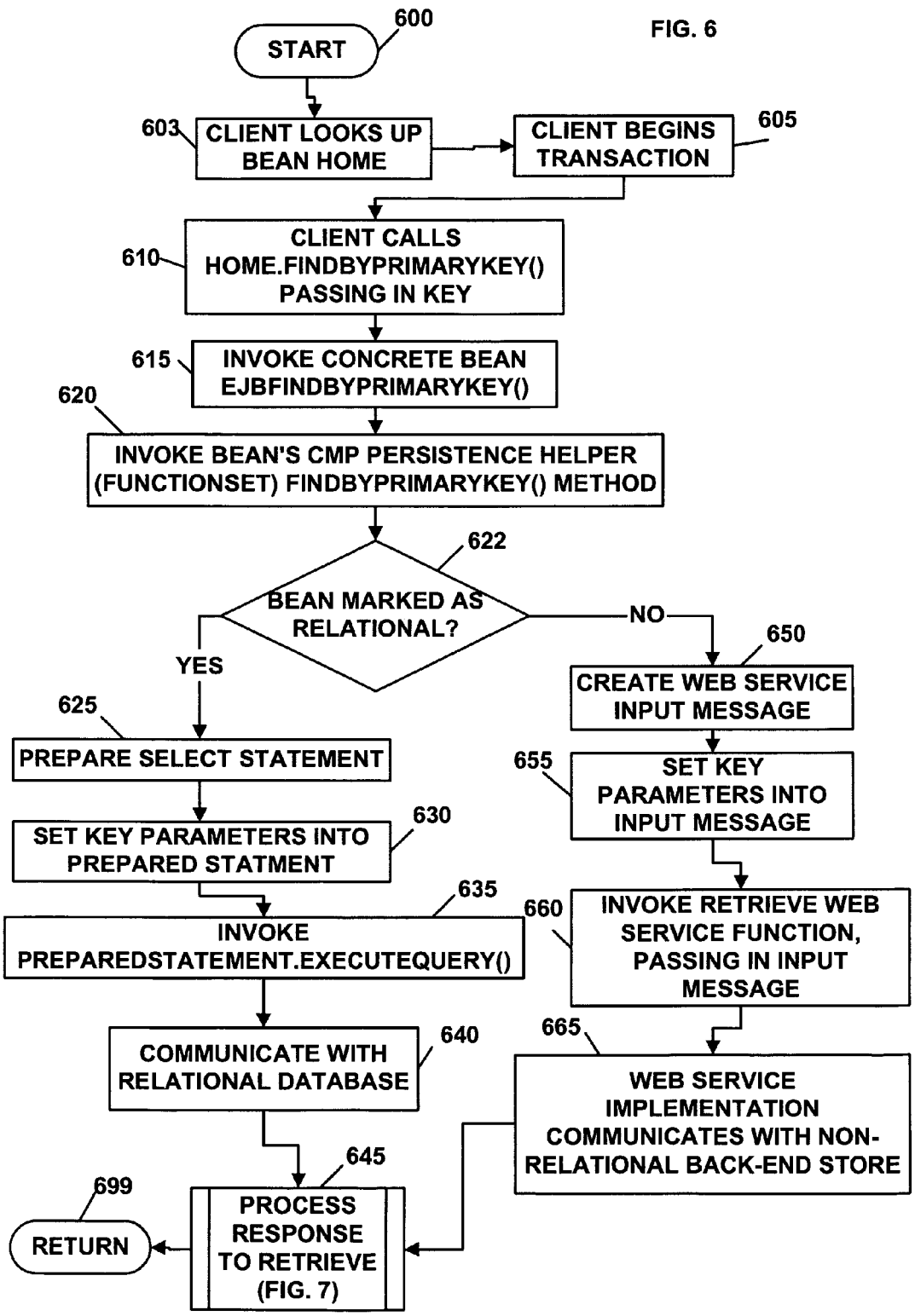
FIG. 6 depicts a flowchart of example processing for a retrieve scenario, according to an embodiment of the invention.

FIG. 6 depicts a flowchart of example processing for a retrieve scenario, according to an embodiment of the invention. Control begins at block 600. Control then continues to block 603 where the client 154 looks up a bean home in preparation for using the CMP bean 140. In an embodiment, the client 154 may look up a bean home using the JNDI (Java Naming and Directory Interface) name space, but in other embodiments any appropriate technique for finding the bean home may be used. Control then continues to block 605 where the client 154 begins a transaction. Examples of transactions include finding data in the non-relational store 170 in the backend 106 or the relational store 160 in the backend 105, but in other embodiments any appropriate transaction may be used.

Control then continues to block 610 where the client 154 invokes a find by primary key method in the CMP bean 140 to create an instance of the CMP bean 140. The client 154 passes a key to the find by primary key method, which specifies the primary key class that the client 154 wishes to use. A primary key is a unique identifier of an object. In an embodiment, the primary key relates directly to a primary key in a database table of the non-relational store 170 and/or the relational store 160. In another embodiment, the primary key does not relate directly (or has no relationship) to a primary key of a database table.

Control then continues to block 615 where the find by primary key method in the CMP bean 140 causes a find by primary key method in the concrete bean class extension 144 to be invoked. In an embodiment, the find by primary key method in the concrete bean class extension 144 is an ejbFindByPrimaryKey( ) method, which is part of EJB (Enterprise Java Beans), but in another embodiment any appropriate find by primary key method may be used.

Control then continues to block 620 where the find by primary key method in the concrete bean class extension 144 causes the CMP bean's 140 persistence helper find by primary key method in the function set 146 to be invoked. Control then continues to block 622 where the find by primary key method in the function set 146 determines whether the CMP bean 140 is marked as relational. If the determination at block 622 is true, then control continues to block 625 where the find by primary key method in the function set 146 prepares a select statement. In an embodiment, the select statement is a JDBC (Java Database Connectivity) select statement, but in other embodiments, the select statement may follow any appropriate protocol.

Control then continues to block 630 where the find by primary key method in the function set 146 sets the key parameters (previously passed at block 610) into the prepared select statement. Control then continues to block 635 where the find by primary key method in the function set 146 invokes the prepared select statement. Control then continues to block 640 where the key parameters are communicated to the relational store 160 in the backend 105. Control then continues to block 645 where the response to the find by primary key method is processed, as further described below with reference to FIG. 7. Control then continues to block 699 where the logic of FIG. 6 returns.

If the determination at block 622 is false, then the CMP bean 140 is marked as non-relational, so control continues to block 650 where the find by primary key method in the function set 146 creates a web service input message. Control then continues to block 655 where the find by primary key method in the function set 146 sets key parameters (previously obtained at block 610) into the created input message. Control then continues to block 660 where the find by primary key method in the function set 146 invokes the retrieve web service function in the web service 134 via the web services invocation framework 132 and passes the input message. Control then continues to block 665 where the web service 134 communicates the input message to the non-relational store 170 in the backend 106. Control then continues to block 645, as previously described above.

Figure 7:
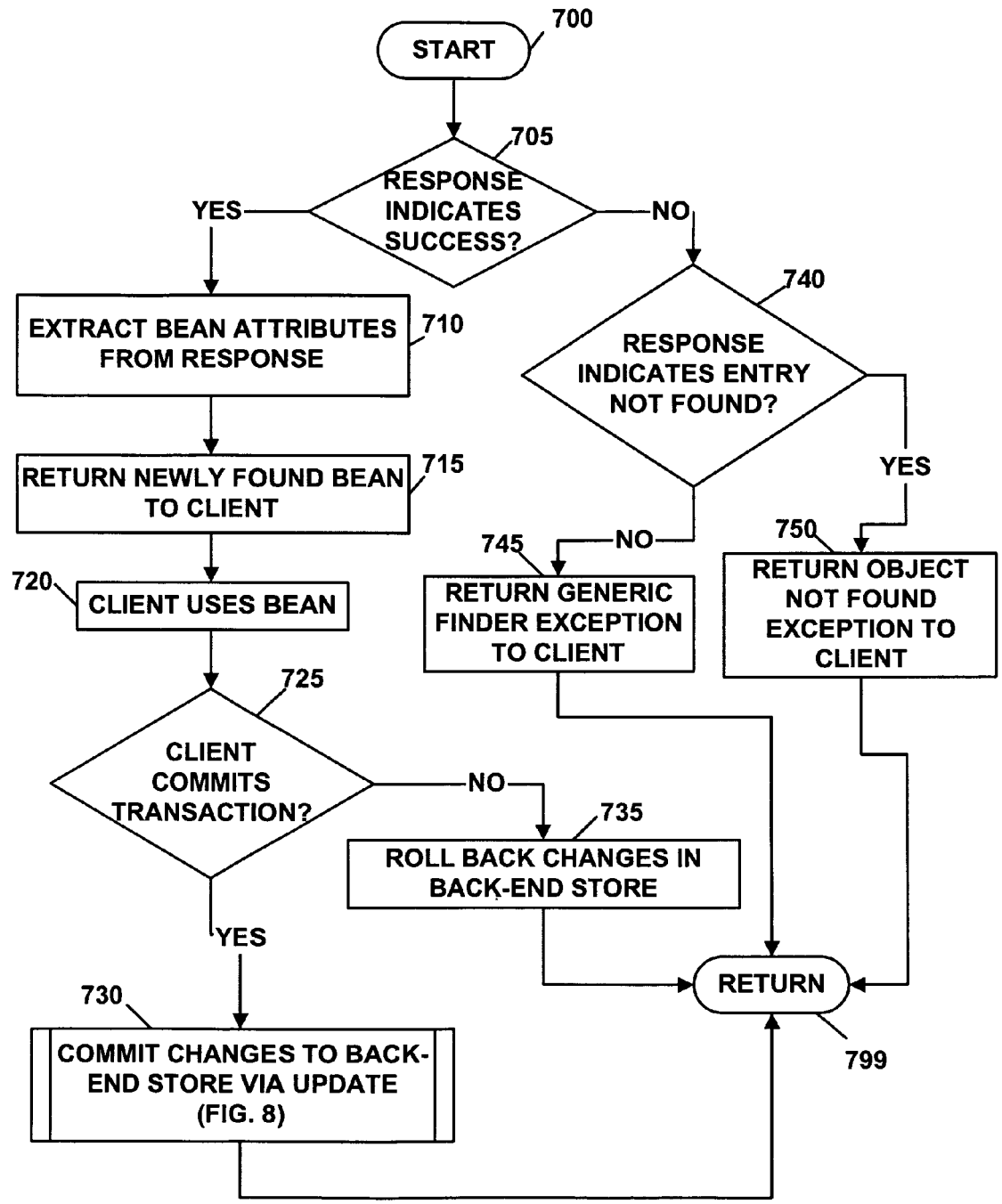
FIG. 7 depicts a flowchart of example processing for a response to a retrieve, according to an embodiment of the invention.

FIG. 7 depicts a flowchart of example processing for a response to a retrieve, according to an embodiment of the invention. Control begins at block 700. Control then continues to block 705 where the find by primary key method in the function set 146 determines whether the response to the input message or prepared statement indicates success.

If the determination at block 705 is true then control continues to block 710 where the find by primary key method in the function set 146 extracts bean attributes from the response. Control then continues to block 715 where the find by primary key method in the function set 146 returns the newly found bean to the client 154. Control then continues to block 720 where the client 154 uses the bean to meet the client's needs.

Control then continues to block 725 where the client 154 decides whether to commit the transaction to the back-end store (either the non-relational store 170 or the relational store 160). If the determination at block 725 is true, then control continues to block 730 where the changes are committed to the back-end store via an update, as further described below with reference to FIG. 8. Control then continues to block 799 where the logic of FIG. 7 returns.

If the determination at block 725 is false, then control continues to block 735 where the changes are rolled back in the back-end store (either the non-relational store 170 or the relational store 160). Control then continues to block 799 where the logic of FIG. 7 returns.

If the determination at block 705 is false, then the response indicates failure, so control continues to block 740 where the find by primary key method in the function set 146 determines whether the response indicates the key entry was not found. If the determination at block 740 is true, then the entry was not found, so control continues to block 750 where the find by primary key method in the function set 146 returns a object not found exception to the client 154. Control then continues to block 799 where the logic of FIG. 7 returns.

If the determination at block 740 is false, then control continues to block 745 where the find by primary key method in the function set 146 returns a generic finder exception to the client 154. Control then continues to block 799 where the logic of FIG. 7 returns.

Figure 8:
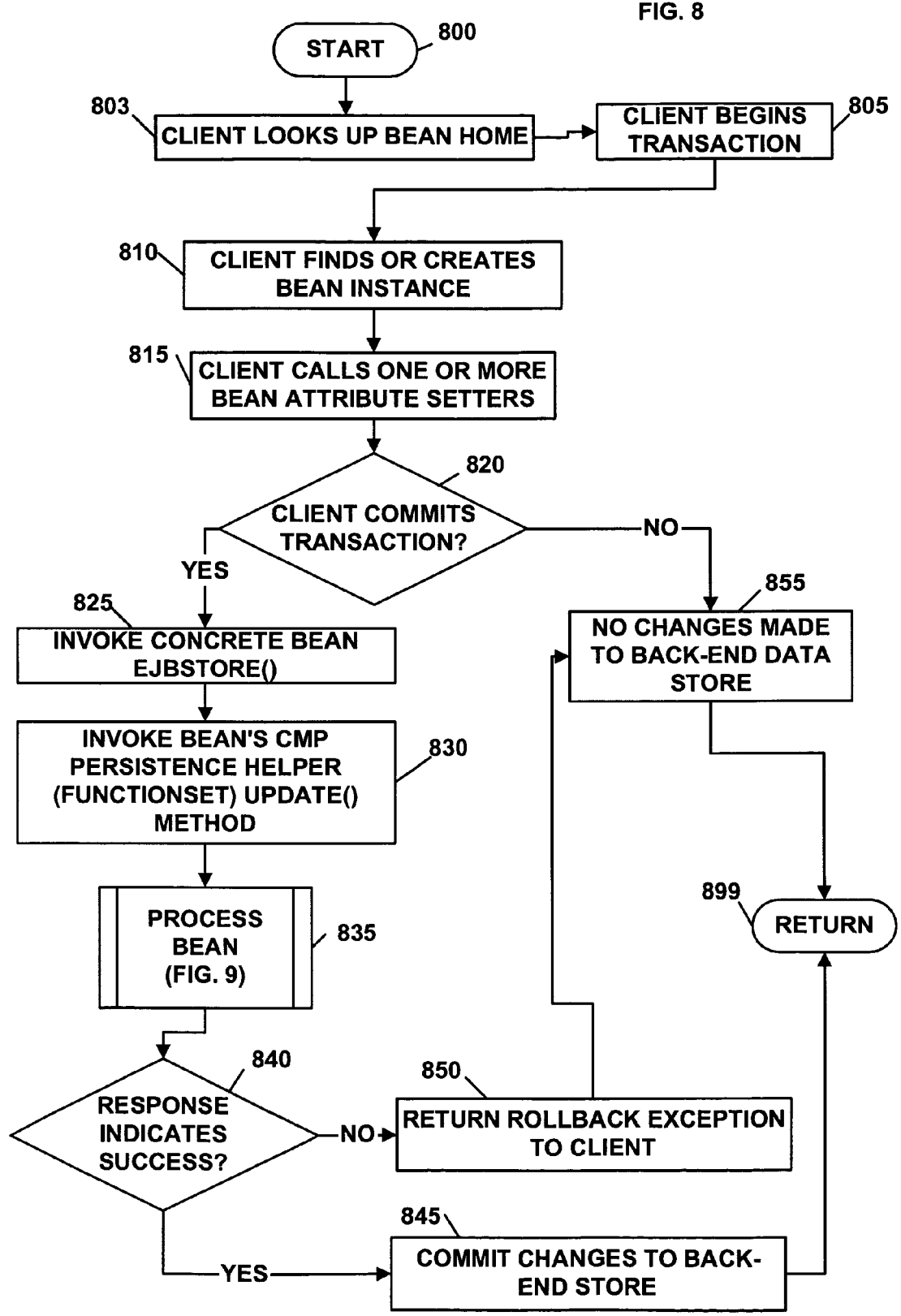
FIG. 8 depicts a flowchart of example processing for an update scenario, according to an embodiment of the invention.

FIG. 8 depicts a flowchart of example processing for an update scenario, according to an embodiment of the invention. Control begins at block 800. Control then continues to block 803 where the client 154 looks up a bean home in preparation for using the CMP bean 140. In an embodiment, the client 154 may look up a bean home using the JNDI (Java Naming and Directory Interface) name space, but in other embodiments any appropriate technique for finding the bean home may be used. Control then continues to block 805 where the client 154 begins a transaction. Examples of transactions include updating data in the non-relational store 170 in the backend 106 or the relational store 160 in the backend 105, but in other embodiments any appropriate transaction may be used.

Control then continues to block 810 where the client 154 finds or creates an instance of the CMP bean 140. Control then continues to block 815 where the client 154 calls one or more of the bean attribute setters.

Control then continues to block 820 where the function set 146 determines whether the client 154 wishes to commit the transaction.

If the determination at block 820 is true, then control continues to block 825 where the CMP bean 140 causes a store method in the concrete bean class extension 144 to be invoked. In an embodiment, the store method in the concrete bean class extension 144 is an ejbStore( ) method, which is part of EJB (Enterprise Java Beans), but in another embodiment any appropriate store method may be used. Control then continues to block 830 where the store method in the concrete bean class extension 144 causes the CMP bean's 140 persistence helper update method in the function set 146 to be invoked. Control then continues to block 835 where the bean is processed as further described below with reference to FIG. 9.

Figure 9:
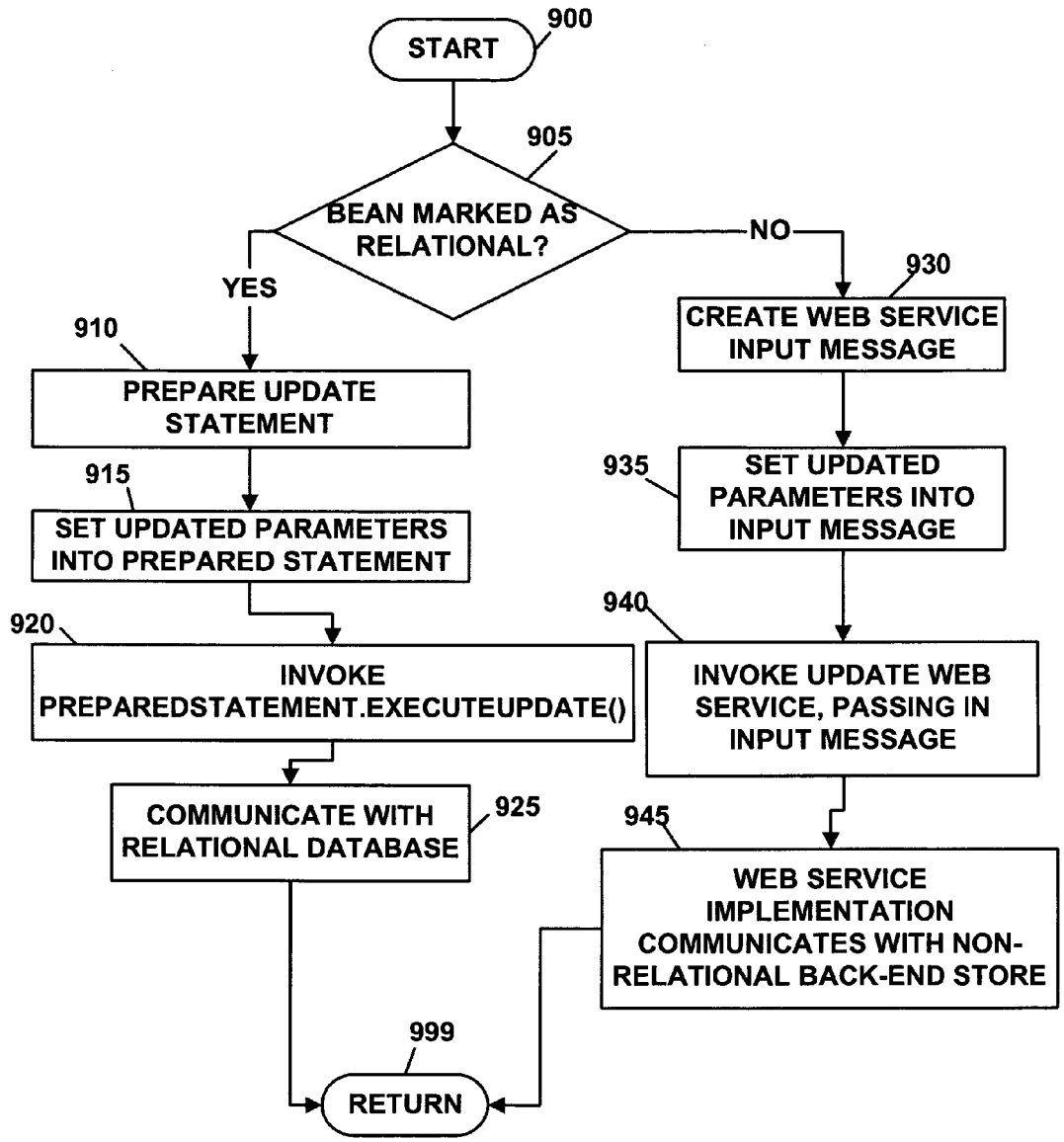
FIG. 9 depicts a flowchart of example processing for an update, according to an embodiment of the invention.

Control then continues to block 840 where the update method in the function set 146 determines whether the response to the input message or prepared statement previously prepared as described in FIG. 9 indicates success.

If the determination at block 840 is true then control continues to block 845 where the update method in the function set 146 causes the changes in the back-end store (either the non-relational store 170 or the relational store 160) to be committed. Control then continues to block 899 where the logic of FIG. 8 returns.

If the determination at block 840 is false, then control continues to block 850 where the update method in the function set 146 returns a rollback exception to the client 154 and no changes are made to the back-end store as indicated in block 855. Control then continues to block 899 where the logic of FIG. 8 returns.

If the determination at block 820 is false, then the transaction is not committed, so no changes are made to the back-end store (either the non-relational store 170 or the relational store 160) as indicated in block 855. Control then continue to block 899 where the logic of FIG. 8 returns.

FIG. 9 depicts a flowchart of example processing for an update, according to an embodiment of the invention. Control begins at block 900. Control then continues to block 905 where the update method in the function set 146 determines whether the CMP bean 140 is marked as relational. If the determination at block 905 is true, then control continues to block 910 where the update method in the function set 146 prepares an update statement. In an embodiment, the update statement is a JDBC (Java Database Connectivity) update statement, but in other embodiments, the update statement may follow any appropriate protocol.

Control then continues to block 915 where the update method in the function set 146 sets the updated parameters into the prepared update statement. Control then continues to block 920 where the update method in the function set 146 invokes the prepared update statement. Control then continues to block 925 where the updated parameters are communicated to the relational store 160 in the backend 105. Control then continues to block 999 where the logic of FIG. 9 returns.

If the determination at block 905 is false, then the CMP bean 140 is marked as non-relational, so control continues to block 930 where the update method in the function set 146 creates a web service input message. Control then continues to block 935 where the update method in the function set 146 sets updated parameters into the created input message. Control then continues to block 940 where the update method in the function set 146 invokes the update web service function in the web service 134 via the web services invocation framework 132 and passes the input message. Control then continues to block 945 where the web service 134 communicates the input message to the non-relational store 170 in the backend 106. Control then continues to block 999 where the logic of FIG. 9 returns.

Figure 10A:
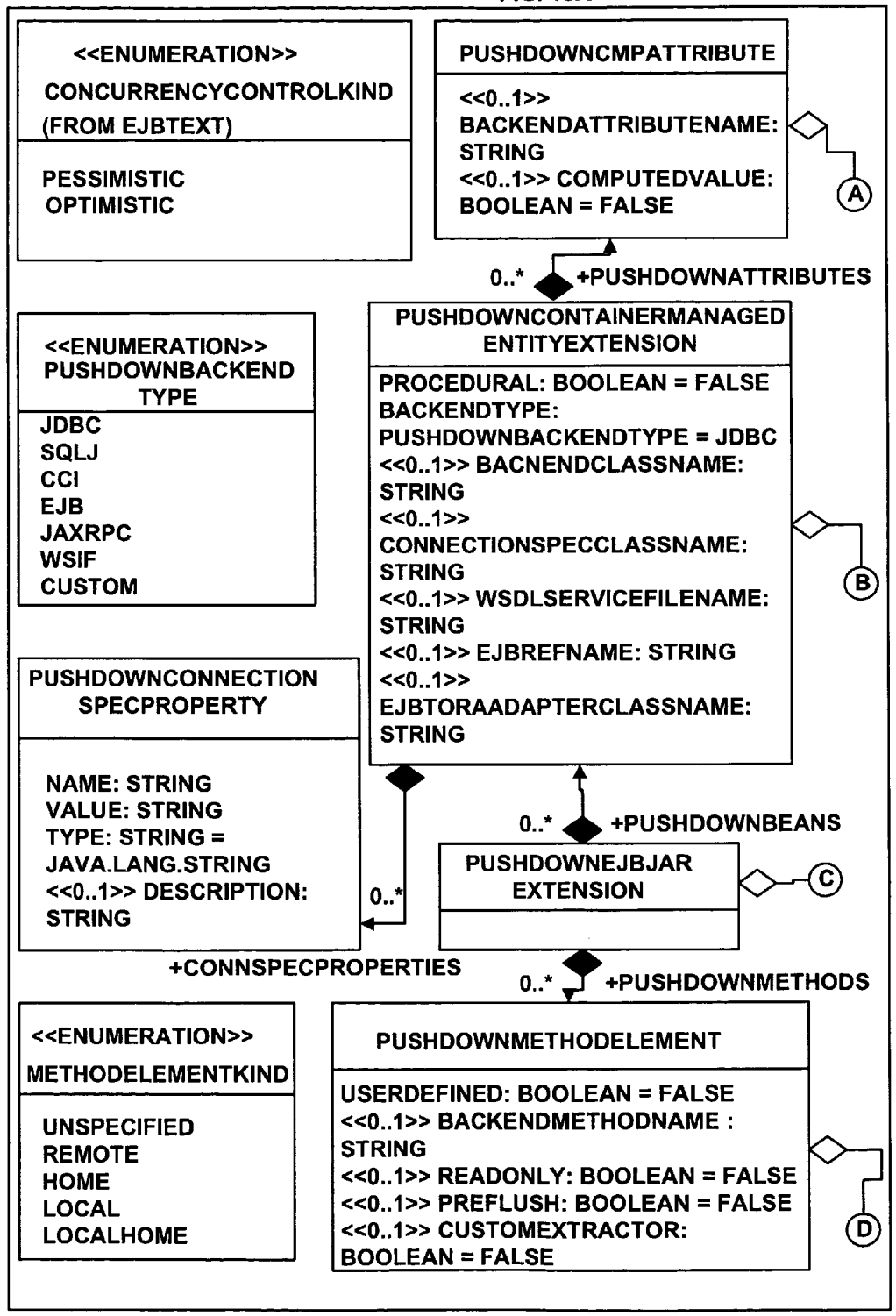
FIG. 10A depicts an block diagram of a model of meta-data associated with a deployment descriptor extension, according to an embodiment of the invention.
Figure 10B:
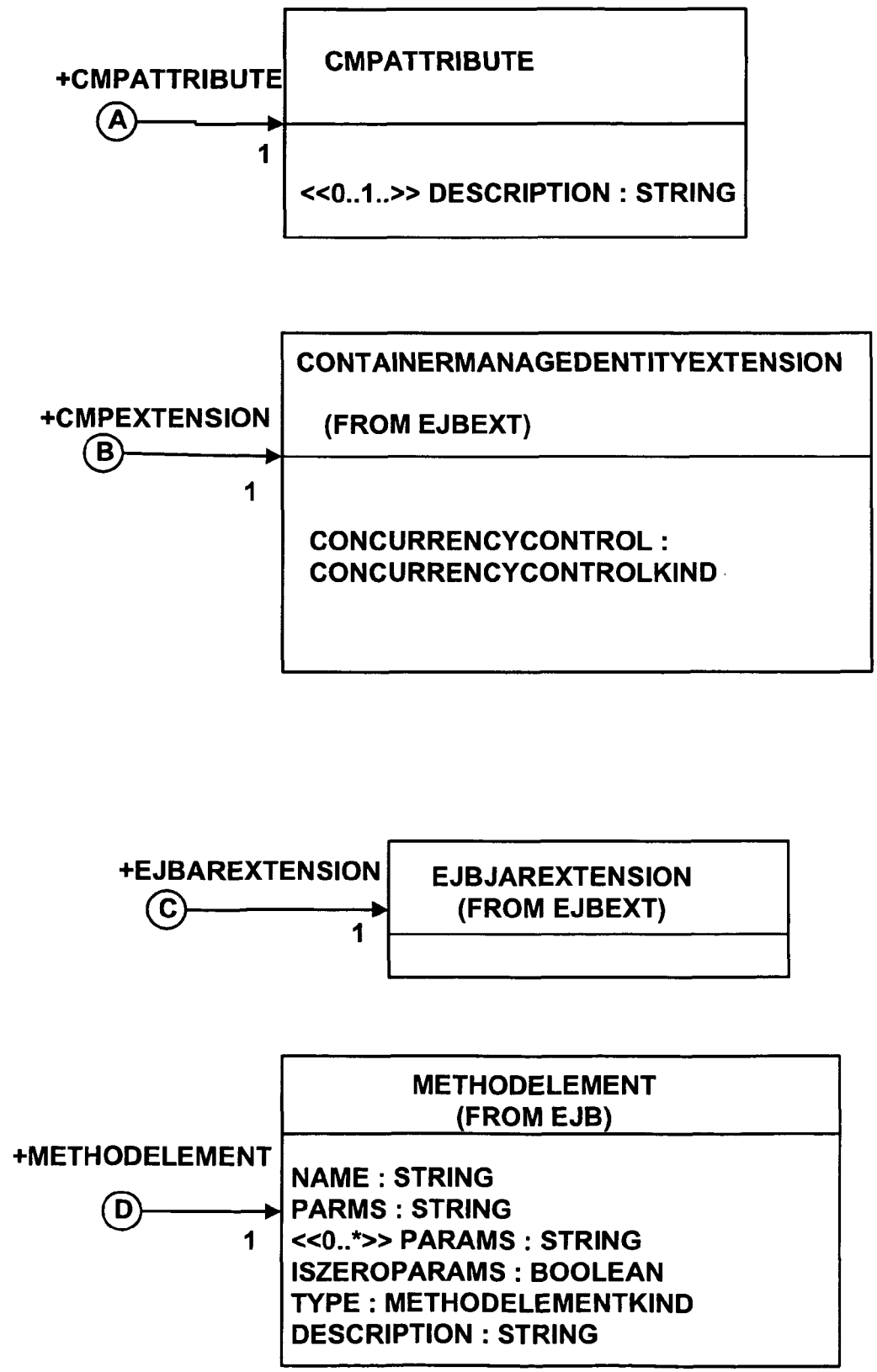
FIG. 10B depicts an block diagram of a model of meta-data associated with a deployment descriptor extension, according to an embodiment of the invention.

Each vendor is free to determine the schema of their proprietary deployment descriptor extensions. FIGS. 10A and 10B depict an example embodiment of a Unified Modeling Language (UML) diagram of a model of the meta-data associated with such a deployment descriptor extension, where, in an embodiment, the backEndType has a value of either "JAX-RPC" or "WSIF").

The following sample control tags and data depict an example embodiment in which such a model has been externalized to a deployment descriptor extension XML file, with example values for the relevant model elements:

```
<?xml version="1.0" encoding="ASCII"?>
<pushdownejbext:PushDownEJBJarExtension xmi:version="2.0"
xmlns:xmi="http://www.omg.org/XMI"
xmlns:pushdownejbext="http://www.ibm.com/websphere/appserver/schemas/5.1/
pushdownejbext.xmi">
    <pushDownBeans procedural="true" backEndType="WSIF"
wsdlServiceFileName="Account.wsdl"/>
    <pushDownMethods backEndMethodName="createAccount" readOnly="false">
        <methodElement name="ejbCreate" parms="java.lang.Integer float"/>
    </pushDownMethods>
    <pushDownMethods backEndMethodName="findAccount" readOnly="true">
        <methodElementname="ejbFindByPrimaryKey"
        parms="java.lang.Integer"/>
    </pushDownMethods>
    <pushDownMethods backEndMethodName="updateAccount" readOnly="false">
        <methodElement name="ejbStore" isZeroParams="true"/>
    </pushDownMethods>
    <pushDownMethods backEndMethodName="deleteAccount" readOnly="false">
        <methodElement name="ejbRemove" isZeroParams="true"/>
    </pushDownMethods>
</pushdownejbext:PushDownEJBJarExtension>
```

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A storage medium encoded with instructions, wherein the instructions when executed comprise:
receiving a key parameter from a container-managed persistent bean;
determining whether the container-managed persistent bean is associated with a non-relational data store, wherein the determining whether the container-managed persistent bean is associated with the non-relational data store is further based on deployment description extension settings specified by a bean assembler, wherein the determining whether the container-managed persistent bean is associated with the non-relational data store further comprises determining whether the container-managed persistent bean is marked as non-relational, wherein a method in the container-managed persistent bean causes invocation of a persistent helper method in a persistence manager, and wherein the persistent helper method in the persistence manager performs the determining;
if the container-managed persistent bean is not associated with the non-relational data store, inserting the key parameter into a prepared statement and communicating the key parameter to a relational data store; and
if the container-managed persistent bean is associated with the non-relational data store, creating a web service input message with the key parameter and invoking a web service function with the web service input message, wherein the web service function communicates the web service input message to the non-relational data store, wherein the invoking further comprises invoking the web service function with the web service input message without using an interface to the non-relational data store.

2. The storage medium of claim 1, wherein the method in the container-managed persistent bean comprises a create method, wherein the create method is passed the key parameter by a client, and wherein the create method creates an instance of the container-managed persistent bean.

3. The storage medium of claim 2, wherein the key parameter specifies an instance of a primary key class that the client desires to use.

4. The storage medium of claim 1, wherein the key parameter is associated with a command to create data in the non-relational data store.

5. The storage medium of claim 1, wherein the key parameter is associated with a command to retrieve data from the non-relational data store.

6. The storage medium of claim 1, wherein the key parameter is associated with a command to update data in the non-relational data store.

7. The storage medium of claim 1, wherein the key parameter is associated with a command to delete data from the non-relational data store.

8. The storage medium of claim 1, wherein the method in the container-managed persistent bean comprises a remove method, wherein the remove method is passed the key parameter by a client, and wherein the remove method creates an instance of the container-managed persistent bean.

9. A server comprising:

a processor; and a storage device connected to the processor, wherein the storage device is encoded with instructions, and wherein the instructions when executed on the processor comprise:

receiving a key parameter from a container-managed persistent bean, determining whether the container-managed persistent bean is associated with a non-relational data store, wherein the determining whether the container-managed persistent bean is associated with the non-relational data store is further based on deployment description extension settings specified by a bean assembler, wherein the determining whether the container-managed persistent bean is associated with the non-relational data store further comprises determining whether the container-managed persistent bean is marked as non-relational, wherein a method in the container-managed persistent bean causes invocation of a persistent helper method in a persistence manager, and wherein the persistent helper method in the persistence manager performs the determining, if the container-managed persistent bean is not associated with the non-relational data store, inserting the key parameter into a prepared statement and communicating the key parameter to a relational data store, and if the container-managed persistent bean is associated with the non-relational data store, creating a web service input message with the key parameter and invoking a web service function with the web service input message, wherein the web service function communicates the web service input message to the non-relational data store, wherein the invoking further comprises invoking the web service function with the web service input message without using an interface to the non-relational data store.

10. The server of claim 9, wherein the method in the container-managed persistent bean comprises a create method, wherein the create method is passed the key parameter by a client, and wherein the create method creates an instance of the container-managed persistent bean.

11. The server of claim 10, wherein the key parameter specifies an instance of a primary key class that the client desires to use.

12. The server of claim 9, wherein the key parameter is associated with a command to create data in the non-relational data store.

13. The server of claim 9, wherein the key parameter is associated with a command to retrieve data from the non-relational data store.

14. The server of claim 9, wherein the key parameter is associated with a command to update data in the non-relational data store.

15. The server of claim 9, wherein the key parameter is associated with a command to delete data from the non-relational data store.

16. The server of claim 9, wherein the method in the container-managed persistent bean comprises a remove method, wherein the remove method is passed the key parameter by a client, and wherein the remove method creates an instance of the container-managed persistent bean.

* * * * *